No. 673,748.  
Patented May 7, 1901.

G. G. HOWE.
LINK FOR DRIVE CHAINS.
(Application filed May 22, 1900.)

(No Model.)

WITNESSES  
Geo. B. Fleming  
Chas. C. Bittner

INVENTOR  
Glenn G. Howe  
by Bakewell & Bakewell  
his Attorneys.

UNITED STATES PATENT OFFICE.

GLENN G. HOWE, OF INDIANAPOLIS, INDIANA, ASSIGNOR TO THE EWART MANUFACTURING COMPANY, OF CHICAGO, ILLINOIS.

LINK FOR DRIVE-CHAINS.

SPECIFICATION forming part of Letters Patent No. 673,748, dated May 7, 1901.

Application filed May 22, 1900. Serial No. 17,507. (No model.)

*To all whom it may concern:*

Be it known that I, GLENN G. HOWE, of Indianapolis, Marion county, Indiana, have invented a new and useful Improvement in Links for Drive-Chains, of which the following is a full, clear, and exact description, reference being had to the accompanying drawings, forming part of this specification, in which—

Figure 1:
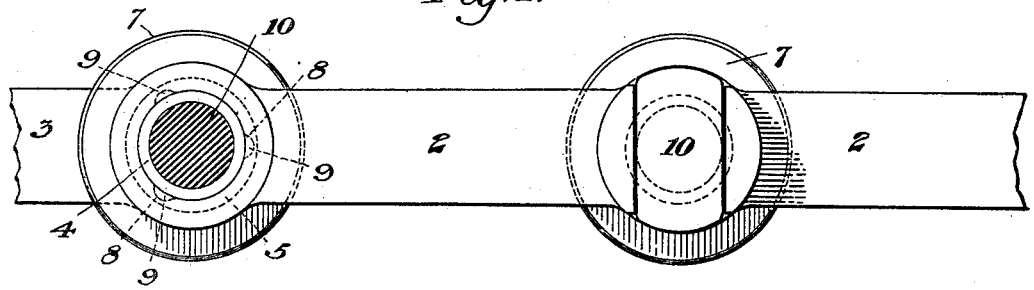
Figure 2:
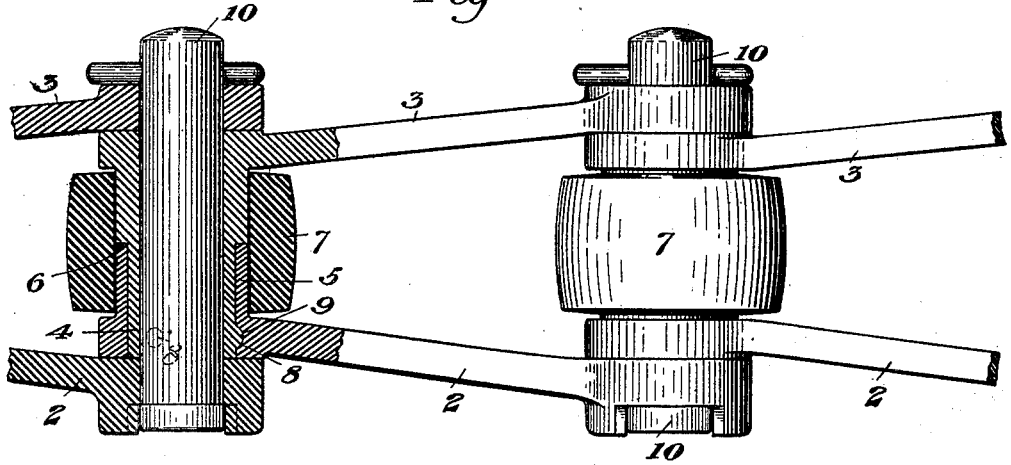
Figure 3:
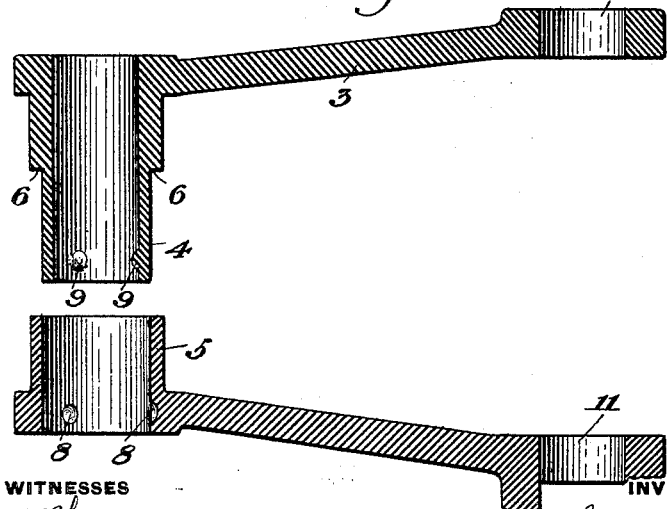

Figure 1 is a side elevation, partly in vertical section, of part of a chain made up of my improved links. Fig. 2 is a plan view, partly in vertical section; and Fig. 3 is a sectional detail view.

My invention relates to that class of chain-links in which the links are fitted at the ends with antifriction-rollers; and it is designed to overcome the objections to which such links are subject and to make a more substantial and durable construction than heretofore.

In the drawings, 2 3 are the side bars of my improved link, having at the ends inwardly-projecting sleeves 4 5, the sleeve 4 fitting telescopically within the sleeve 5 and the latter abutting against an annular shoulder 6 on the sleeve 4. The sleeves present a cylindrical barrel or bearing surface of uniform diameter for the roller 7, and by reason of their interfitting they brace each other and prevent as much as possible loose motion and wearing of the parts of the link and roller. In this way I secure important results, for I increase the durability of the link and obviate the disadvantages which have been a fruitful source of trouble in prior constructions.

For the purpose of holding the sleeves together I prefer to use the construction shown in the drawings and to form on the interior of the sleeve 5 depressions or sockets 8 and on the interior of the sleeve 4 inwardly-projecting protuberances or thickened portions 9, so placed as to register with the recesses 8 when the sleeves are interfitted. When the parts are assembled and the sleeve 4 fitted within the sleeve 5, I insert a tool within the sleeve 4 and by pressure applied to the protuberances 9 force them outwardly, thus displacing the metal outwardly into the recesses 8. In this way the sleeves are fixed together, and the inner surface of the sleeve is left flush for the insertion of the pin 10, by which when the links of the chain are finally assembled the sleeve end of the link is connected to the eyes 11 11 at the free ends of the side bars 2 3.

It will be noted that when the side bars have been secured by interfitting and fastening the sleeves 4 5 the link becomes a permanent unit and that a chain can be constituted by assembling the desired number of such previously-formed units and securing them by the pins 10. This is of material advantage as compared with other links whose parts cannot be assembled permanently until the chain itself is made up.

Within the scope of my invention as defined in the claims changes may be made in the form and construction of the parts, since

What I claim is—

1. A chain-link having side bars with sleeves fitted one within the other, one sleeve having on its interior surface depressions, and the other sleeve having on its interior surface inwardly-projecting protuberances, adapted to register with the depressions, and to be displaced outwardly thereinto; substantially as described.

2. A chain-link having side bars provided at one end with sleeves, a roller on the sleeves, and means whereby said sleeves are held together as a permanent unit, said sleeves being hollow and adapted to be connected by a pin to the free ends of the side bars of an adjacent link; substantially as described.

3. A chain-link having side bars fixed permanently together at one end by an intermediate sleeve portion, and a roller on the sleeve portion, said side bars being free at the other end of the link and adapted to be attached to the sleeved portion of an adjacent link; substantially as described.

In testimony whereof I have hereunto set my hand.

GLENN G. HOWE.

Witnesses:
CLINTON E. PROUSE,
H. D. GORDON.